March 14, 1944.  H. A. SCOTT ET AL  2,344,271

POWER HOISTING DEVICE FOR TRACTOR TOOLS

Filed Nov. 19, 1941  3 Sheets-Sheet 1

Inventors
Harold A. Scott
and Eric W. Carlson
By Clayton R. Jenks
Attorney

Witness
Herbert E. Covey

March 14, 1944.  H. A. SCOTT ET AL  2,344,271
POWER HOISTING DEVICE FOR TRACTOR TOOLS
Filed Nov. 19, 1941  3 Sheets-Sheet 2
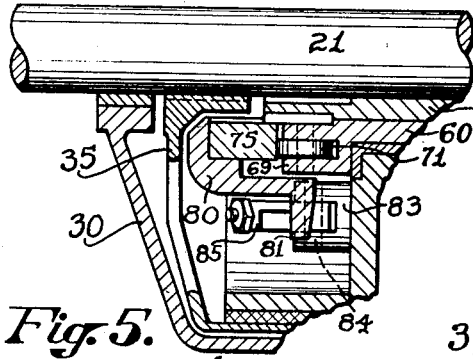
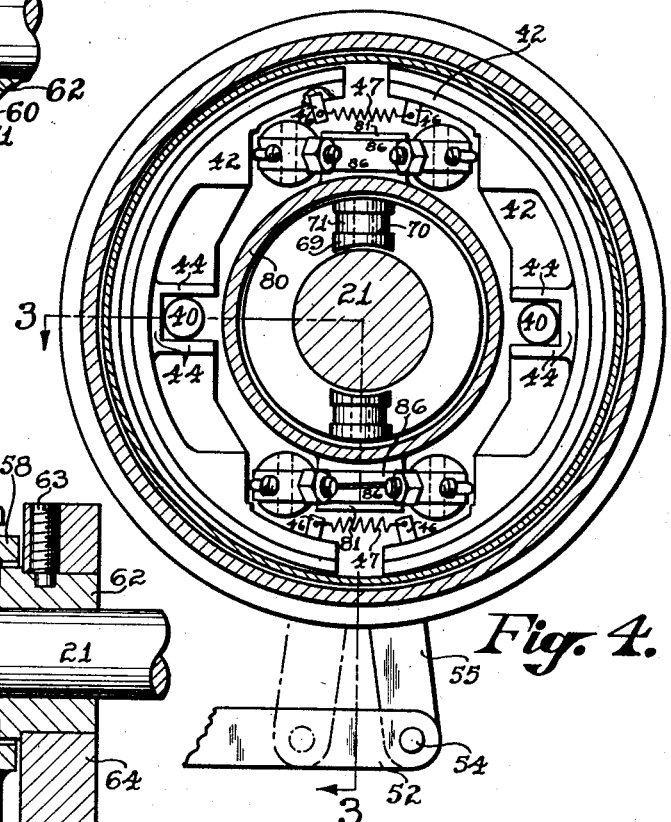
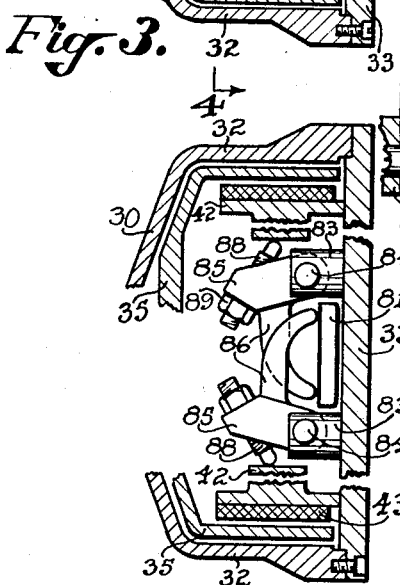
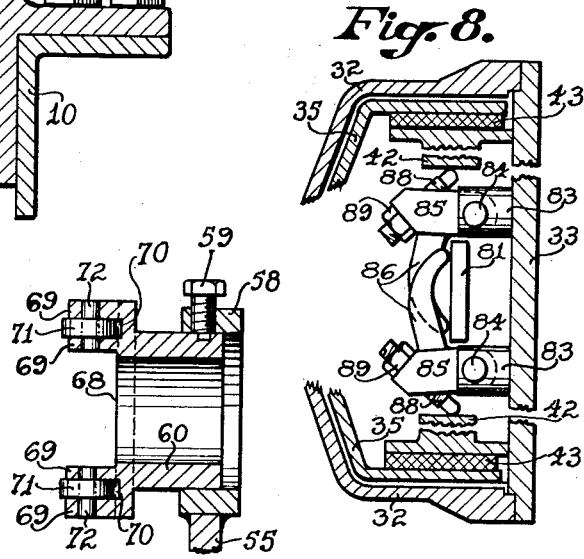
Inventors
Harold A. Scott
and Eric W. Carlson
By Clayton R. Jenks
Attorney
Witness
Herbert E. Covey

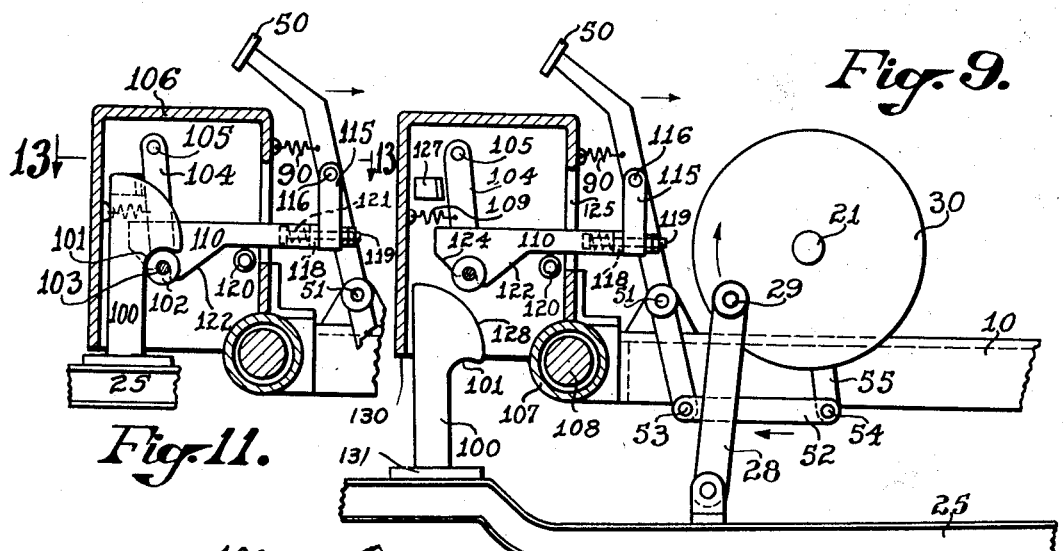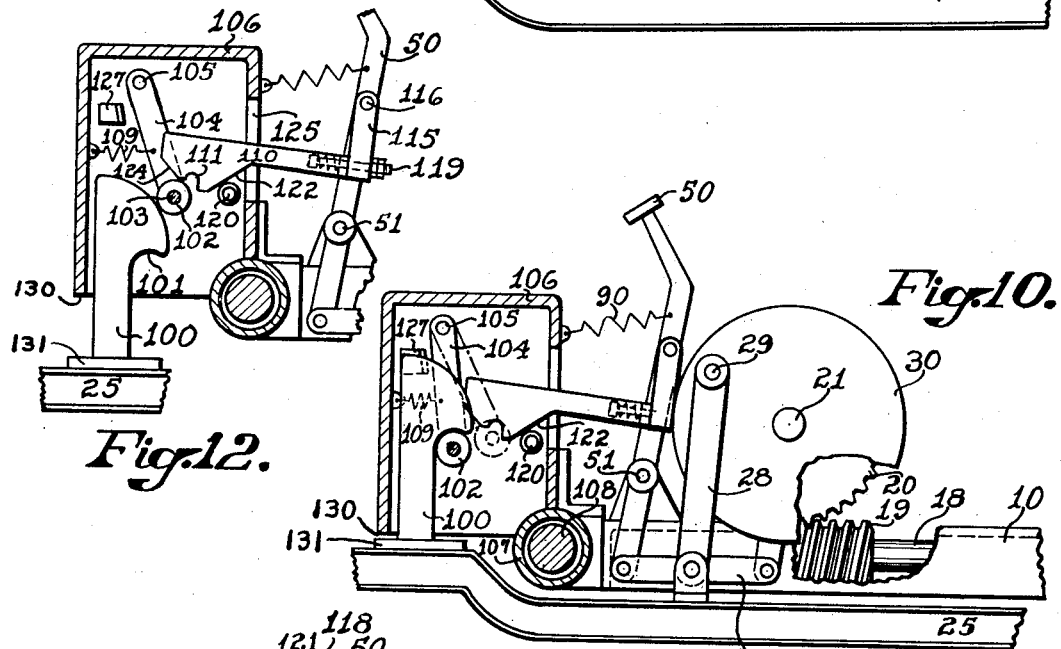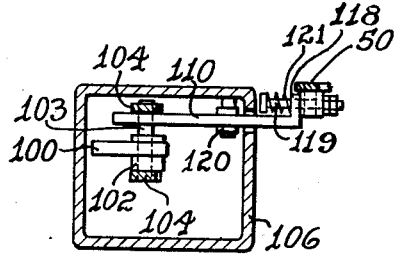

Patented Mar. 14, 1944

2,344,271

UNITED STATES PATENT OFFICE 2,344,271

POWER HOISTING DEVICE FOR TRACTOR TOOLS

Harold A. Scott, Boylston, and Eric W. Carlson, Auburn, Mass.

Application November 19, 1941, Serial No. 419,662

4 Claims. (Cl. 97—50)

This invention relates to a hoisting mechanism for a tractor driven farm tool, and more particularly, to a power driven mechanism mounted on a tractor carrying a plow or other tool which serves to lift the tool from the ground when desired.

Various types of farm tools are now mounted directly on tractors and movably supported to be lowered and raised to and from their operative positions. When one is plowing or mowing a rough field, it often becomes necessary to lift the plow or the sickle bar, for example, over a stone or other obstruction. These farm tools are very heavy and the manual effort required for lifting the same is necessarily great; hence it is desirable that this operation be performed by power mechanism carried on the tractor. Various types of plow lifts have been provided heretofore, but these have not permitted a proper control of the farm tool. For example, one form is such that a plow must be lifted through a fixed and maximum distance before it can be returned to the furrow, hence it is not possible to lift the plow over a low obstruction and then immediately return it for operation, but it is required that the plow move to the entire extent and thus leave a part of the ground unturned. Moreover, it is very desirable that a heavy plow or farm tool be dropped back into an operative position at a controlled rate so as to prevent breaking the plow or causing other damage.

A primary object of our invention is to provide a hoisting mechanism for a power driven tractor which will serve to lift a farm implement at the will and under the control of the operator.

A further object is to provide a tractor power hoist which is so constructed and arranged that a plow or other farm tool may be lifted automatically through any desired distance within the capacity of the mechanism and then be returned directly to an operative position.

A further object of the invention is to provide a mechanism of this general class wherein the tool may be lifted through a desired distance and then returned to an operative position rapidly or slowly at a controlled rate as desired by the operator.

A further object is to provide a power hoisting device for a tractor which will serve to lift a tool to an inoperative position and hold it there indefinitely without further effort on the part of the operator and wherein the tool may be returned to an operative position at a controlled rate. Further objects will be apparent in the following disclosure.

In accordance with this invention, we have mounted a farming implement, such as a plow, cultivator, harrow or other digging tool or a grass or grain mowing cutter bar or other suitable device, on a power driven tractor, and we provide manually controlled power actuated mechanism for moving that farm implement to and from an operative position. For example, a plow is supported on the tractor frame by a pivotal connection at the end of the plow beam and a lifting device is connected to an intermediate portion of the plow beam for raising the plow from the furrow. The lifting device is actuated by a power operated mechanism which is preferably driven by the tractor motor, such as the power drive from a gasolene motor to the tractor wheels. Our preferred construction comprises a crank arm or cable connected to the farm tool and moved by a crankshaft or drum which is brought into operation at any time by actuating a manually controlled lever, actuated by hand or foot, which is connected to operate a clutch and connect the drum or crank arm to the power drive. The clutch preferably comprises brake shoes adapted to be thrust into frictional gripping engagement with a continuously rotated brake drum, and these shoes are connected to revolve the crank arm that lifts the plow. The parts are so constructed that upon actuation of the control lever the brake shoes may be brought into gripping engagement with the drum and the plow will be positively lifted thereby to any desired elevation or until the plow has reached a stop on the frame after which the brake shoe may slip on the brake drum until the control lever has been released. This mechanism is such that upon release of the brake shoe, or by a second actuation thereof as hereinafter described, the plow may be quickly or slowly dropped back to its operative position. Also, the parts are so made that the clutch may be held in frictional engagement with the driving member for any desired length of time so that the plow may be elevated to any desired level, after which it may be returned to the ground at a controlled rate. A further feature involves providing a locking mechanism which is so constructed that the plow may, if desired, be elevated to an uppermost position and there held for any desired length of time, after which a further actuation of the control mechanism will serve to release the lock and permit the plow to return to the ground. Thus, we may control the entire vertical movement of the plow and raise it to any desired position and lower it again directly from that position, or we may lock the plow in an uppermost position and carry it there as long as desired, after which it may be dropped.

While this invention applies to the operation of cultivators, harrows and the many types of plows and other ground tilling instruments, as well as the cutter bars of mowing machines and the like, it will be described as applied to the control of a plow, and it is to be understood that the claims are to be interpreted as covering all of these other various types of tractor drawn implements.

Referring to the drawings which illustrate a tractor conventionally we have there shown a mechanically operated power lifting mechanism driven from the tractor engine and arranged to lift a plow and wherein:

Fig. 3 is a section of the clutch control hoisting mechanism taken on the line 3—3 of Fig. 4;

Fig. 4 is a vertical section taken substantially on the line 4—4 of Fig. 3;

Fig. 5 is a fragmentary sectional detail showing the clutch operating cam and roller in a clutch engaged position;

Fig. 6 is a detail showing the supporting sleeve for the cam rollers which operate the clutch;

Figs. 7 and 8 are fragmentary details showing the clutch and the operating dogs in their two end positions;

Fig. 9 is a detail in vertical elevation showing the plow supporting mechanism when the plow is in an operative position;

Fig. 10 is a similar view showing the plow beam supported by the locking mechanism of Fig. 9;

Fig. 11 is a detail showing how the plow lock may be released;

Fig. 12 is a similar detail showing the locations of the parts with the plow beam in an intermediate position; and Fig. 13 is a horizontal section on the line 13—13 of Fig. 11.

Figure 2:
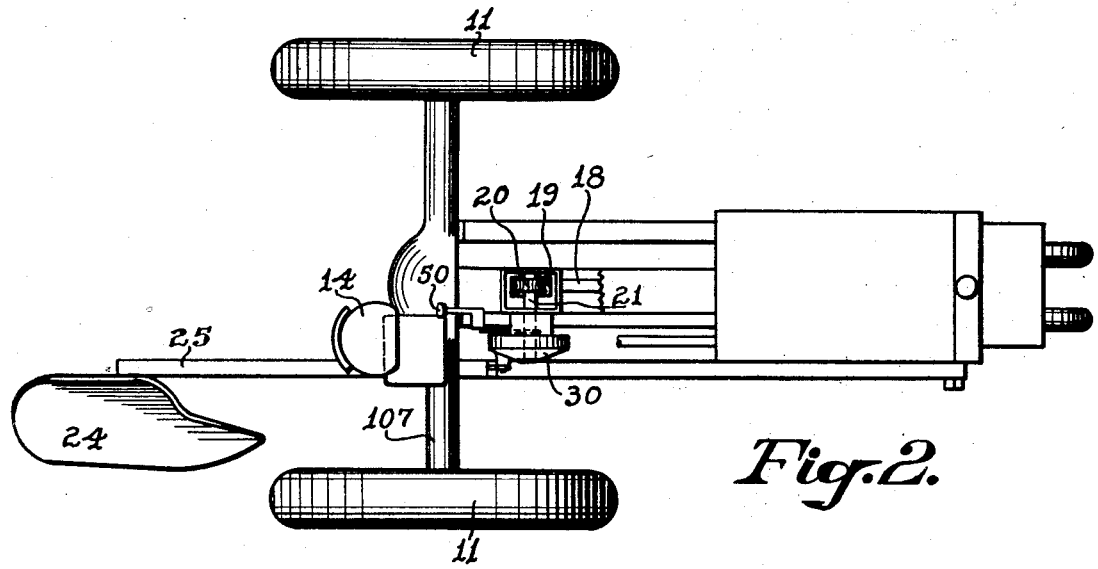
Fig. 2 is a top plan view of the parts shown in Fig. 1.

As illustrated, the tractor, which may be of any suitable construction, comprises a frame 10 having driving wheels 11 and forward steering wheel 12 as well as a motor 13 of any suitable construction, such as the standard gasolene motor employed on such apparatus. The operator of the machine usually rides on the seat 14 and steers the tractor by means of the hand wheel 15 as will be understood. The motor may have a driving shaft 18 (Figs. 2 and 10) suitably connected to drive the wheels 11, and this shaft 18 may carry a worm 19 meshing with a worm wheel 20 on a cross shaft 21 which is the power drive for our special clutch-controlled driving mechanism. The controls for the engine and clutch mechanisms for operating the tractor may be in accordance with standard practice and are not here illustrated.

Figure 1:
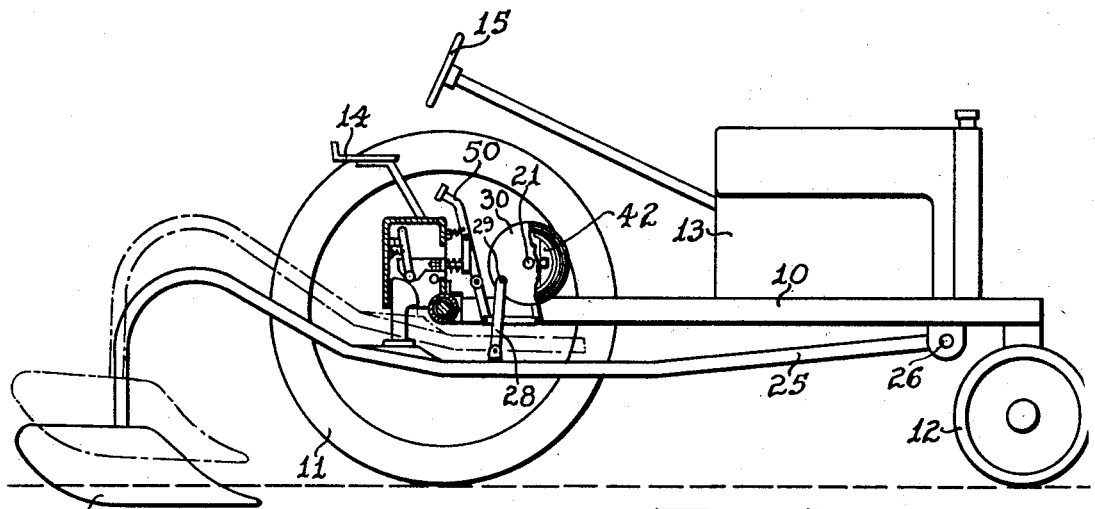
Fig. 1 is a somewhat diagrammatic elevation, partly broken away, showing a tractor carrying a plow and the hoisting mechanism.

The plow 24, or other farm implement, may be carried on a beam 25 which is pivotally mounted on a pin 26 suitably secured to the frame 10 of the tractor. In order to lift the plow, a crank arm 28 (Figs. 1, 9 and 10) is pivotally connected to the plow beam and the upper end of the crank is pivotally connected to a pin 29 on a drum or disk 30 which is driven by the special clutch controlled mechanism to be described. A cable arranged to wind on the drum 30 may be used instead of the crank arm and is the full equivalent thereof. By rotating the drum 30 through an arc of less than 180°, the crank 28 may be lifted from the position shown in Fig. 9 to that of Fig. 10 and the plow will be lifted accordingly from one to the other of these end positions or to any intermediate position as desired.

While various types of clutch controlled mechanisms may be used for our purposes, that shown in Figs. 3 to 8 is preferred. The lifting disk or drum 30 has an inturned flanged portion 32 which forms part of a housing for the special clutch controlled driving mechanism. The driving drum 30 is freely mounted for rotation relative to the cross shaft 21, and it is rotated to revolve the pin 29 only when the clutch mechanism is actuated. A cover plate 33 secured to the drum 30 forms the rear of the enclosure for the clutch mechanism, and it serves as the drive plate to rotate the drum 30 and revolve the crank pin 29.

A driving member 35 located inside the housing 30 has a hub 36 keyed to the shaft 21, so that it is continuously rotated. The member 35 has an inturned flange forming a drum 38, the inner cylindrical surface of which is engaged by the clutch shoes. Two driving pins 40 are mounted on the outer plate 33 and project inwardly parallel with the axis of the shaft 21. Two brake shoes 42 are carried on these two pins 40. The outer surfaces of these two brake shoes are partial cylinders in order to contact fully with the inside of the clutch brake drum 38. The outer surface of each shoe may be formed of suitable brake lining material 43 or as is desired. In order to permit radial movement of those brake shoes 42, each is loosely mounted on the pin 40, as shown particularly in Fig. 4, by means of a three sided rectangular box or slot formed by flanges 44 projecting laterally from the shoe which provide an extensive bearing surface for the pin. The inner portion of this bearing member is open so that the brake shoes may be assembled and freely moved as required. Each of the shoes extends nearly 180° around the clutch drum. The outer ends of the shoes have upstanding pins 46 (Fig. 4) and a spring 47 connects the adjacent pins so that the springs tend to pull the brake shoes inwardly away from the internal cylindrical drum 38.

A primary feature of this invention comprises a control mechanism which may be operated by hand or foot to cause the two clutch members to contact for any desired length of time. To that end, a clutch pedal lever 50 (Figs. 1, 9 and 10) is pivotally mounted on a pin 51 suitably positioned on the frame 10 of the machine, and the pedal is adapted to be thrust forward by the foot of the operator as desired. This pedal lever 50 is a lever of the first degree, and a link 52 is pivotally connected by a pin 53 to the lower short arm of the lever. This link is in turn pivotally connected by a pin 54 to a lever 55 which projects downwardly from the clutch mechanism. The parts are so arranged that forward movement of the foot lever and rearward movement of the dependent lever 55 will tend to spread the brake shoes against the clutch drum and so connect the clutch parts and cause the pin 29 to be revolved about the axis of the clutch mechanism and thus lift the plow to a desired distance while the clutch parts are held in contact.

The lever 55 is fixedly mounted on or connected to a sleeve 58 (Fig. 3) which is connected by a screw 59 to a further sleeve 60. This sleeve 60 is rotatably mounted on the stationary bearing member 62 (Fig. 3) which is carried on and connected, as by a screw 63, to a support 64 suitably mounted on a portion of the machine frame 10. The parts 62 and 64, therefore, constitute a mount and support for all of the clutch mechanism, but the cross shaft 21 may also be mounted in bearings near the worm wheel 20 suitably supported on the machine. As shown particularly in Figs. 3 and 6, the sleeve 60 has a flat annular surface 68 and two upstanding lugs 69 arranged 180° apart. These upstanding members 69 are each provided with a slot within which is mounted the cage 71 of suitable ball bearings. A pin 72 passing through the slotted parts of the lug serves to secure the ball bearing cage in position.

These ball bearings are arranged to ride up the cam face 74 of a cam 75 (see dotted line in Fig. 3) which is slidably keyed by a key 76 to and slides axially on the stationary cylindrical member 62. The cam is so shaped that when the lever 55 is moved by the foot pedal 50 and revolves the sleeve 60, the roller bearings are revolved and ride up that cam face 74 and thus shove the cam 75 laterally toward the left in Fig. 3. A cup-shaped member 80 is rotatably mounted on the lefthand end of the cam, and suitable bearing surfaces are provided therebetween. The cup 80 has two ears 81 which project radially in opposite directions, as shown in Figs. 4, 7 and 8. Mounted on the back cover plate 33 are two pairs of lugs 83 carrying studs 84, on which swinging dog members 85 are pivotally mounted. These dogs have arms 86 projecting inwardly and having curved ends which serve as cams engaging the two lugs 81 of the cup 80. Adjusting screws 88 are threaded through the dogs 85 and held in place by lock nuts 89, as shown. The inner ends of these four screws 88 engage the opposed ends of the brake shoes 42.

The parts are so arranged that rocking movement of these dogs tends to thrust the brake shoes outwardly against the brake drum. This movement is accomplished by the two lugs 81 of the cup 80 being moved by the cam 75 from the position of Fig. 7 to that of Fig. 8. This serves to rock the dogs 85 and cause the adjustable screws 88 to thrust the brake shoes outwardly until the clutch members are engaged and thus force the brake shoes to revolve with the outer rotating clutch drum. The motion is thereby transmitted to the pins 40 and thence to the driving plate 33 and disk 30, and the lifting pin 29 thus moves to lift the plow while the foot pedal is held forward by the operator of the machine. This foot pedal may be held down to lift the plow only a few inches over a stone, or it may be held down for a longer time and cause the plow to lift throughout its entire extent; but at any position of the plow, the operator may release the clutch and allow the plow to slip back either abruptly or slowly. To drop the plow slowly, the operator holds the clutch members in engagement with a light friction and allows them to slip at a desired rate under the weight of the plow as an impelling influence counteracted by the tendency of the driven clutch members to lift the plow. To drop the plow abruptly, the operator allows the spring 90, secured to a fixed part of the machine frame to the foot pedal 50, to draw the pedal back as far as it goes and thus release the clutch. As the shoes and brake linings wear away, the screws 88 may be adjusted to hold the parts in proper positions.

It is often desirable to hoist the plow to an uppermost position and carry it there suspended on the tractor frame for an indefinite time. To this end, we provide the beam 25 with an upstanding hook 100 suitably secured thereto. This hook has a laterally projecting lug forming a hook surface 101 adapted to engage and be suspended on a roller 102 which is in turn mounted on a pin 103 supported by a pair of swinging arms 104. These arms are pivotally suspended on a pin 105 mounted on the side walls 106 of a housing located either in front or in the rear of the axle housing 107 carrying the tractor wheel driving shaft 108 and suitably secured to the framework for the intended purpose. A spring 109 secured to the housing and one of the swinging arms 103 tends to move the roller 102 into a locking position under the hook 101 when the plow has been lifted high enough for the purpose. This takes place when the driving pin 29 supporting the crank arm 28 has moved to a high position which is so located that the plow may be lifted somewhat further without the pin 29 passing over dead center, when it is desired to release the hook and permit the plow to drop.

Various mechanisms may be adopted for controlling the hook, but it is preferred to use the same foot pedal 50 which operates the clutch. This is accomplished by means of a latch 110 which has on its under side a groove 111 of such dimensions and location that at certain times it may hook over the pin 103 which carries the roller 102 and serve to move that roller towards the right when pulled by the foot lever 50. The latch 110 is connected to the foot pedal 50 through a short arm 115 pivotally suspended at 116 on the side of the pedal. As shown in Fig. 13, the latch 110 has an upturned perforated lug 118 in which a headed bolt 119 is slidably mounted. The other end of the bolt is connected to the swinging arm 115. A compression spring 121 serves to hold the parts in the normal positions illustrated, but permits movement of the clutch actuating lever 50 through a sufficient distance to engage the clutch before the roller 102 is withdrawn from the hook 100. A pin 120 is fixed to one of the side walls of the housing 106 in such a position that it may engage a cam surface 122 on the underside of the latch 110. The latch has a further cam surface 124 on its forward edge which is adapted to ride up the pin 103 when required to engage the parts. The vertical slot 125 in the housing 106 permits movement of the latch 110. A stop 127 mounted on the side of the housing 106 projects into the path of one of the arms 104 and so limits the rearward movement of the swinging arms under the impulse of the spring 109.

The operation of this part of the mechanism is such that when the plow hook 100 is to be lifted, the parts are in the positions shown in Fig. 9. The rounded cam surface 128 on the top of the rising hook 100 rides along the roller 102 and moves it toward the right to a position shown in Fig. 12, after which the roller 102 slips into position beneath the engaging surface 101 of the hook 100, as shown in Fig. 10. Prior to the hook 100 locking over the roller 102, the latch member 110 moves to the position shown in Fig. 12 because of the cam surface 122 riding up the stationary pin 120. This lifts the latch 110 from engagement with the pin 103 carrying the roller 102 and permits the roller to swing into locking engagement with the hook when the latter reaches a high enough position, as shown in Fig. 10. If, on the other hand, the operator has held the clutch pedal 50 down for a shorter period of time so that the hook 100 has not locked against the roller 102, then the plow may be returned to the furrow by releasing the clutch.

If the plow has been raised to the hooked position of Fig. 10, the tractor may be now driven as far as desired with the plow thus properly supported in an inoperative position. During this period of time the operator may take his foot off the pedal 50 and allow it to swing back towards the left. This permits the latch 110 to move to the left and downwardly as the cam surface 122 travels down the pin 120, and the latch 110 goes to the position of Fig. 11 where it hooks over the pin 103 carrying the roller 102 and thus is in position for again releasing the hook.

When the operator wishes to drop the plow, he pushes the foot pedal 50 forward through a sufficient distance to pull the roller 102 out from under the hook 100 to the dot and dash position shown in Fig. 10 and thus allow the plow to drop. These parts are preferably so constructed that the clutch members are engaged to lift the plow slightly before the lock is released, after which a slight release of the pressure on the clutch pedal 50 causes the plow to slip downwardly at a slow rate and under the restraining influence of the engaged clutch members. To this end, the surface 101 of the hook 100 is slightly recessed, as shown in the drawings, so that the plow needs to be lifted slightly to permit easy release of the supporting roller 102. The spring 121 yields without pulling the roller 102 from its locking engagement until the clutch members are engaged, and then the spring 121 pulls the roller 102 to the right and releases the plow. During the normal operation of plowing, in which the plow is lifted only part way to get it over a stone in the field, the latch 110 rides idly up and down the fixed pin 120 and the movement of this and associated parts has no effect on the plow because the locking lug 100 is in a lowermost position and cannot be engaged by the hooking members.

It will be appreciated that by means of this mechanism the machine operator may fully control the tool and elevate it either to a slight extent to pass over a low obstruction or to any higher position within the limit defined by contact of a stop formed by the bottom portion 130 of the housing 106 and the plate 131 carried on the plow beam 25. The stop may be otherwise formed and located as desired. Hence, holding the clutch parts connected cannot do any damage because of the frictional slippage thereof. Also the operator may lower the tool at a controlled rate from any elevated position without requiring that it pass through the full cycle of movement.

The control mechanism is operated very simply. When one is plowing a field or cutting grain, the plow or the cutter bar may be lifted slightly by holding the clutch parts connected until that obstruction has been passed, and then by a slight letting up of the pressure on the manually controlled lever 50 the plow or cutter bar may be returned at a controlled rate to its operative position. If the tool is elevated to its maximum extent, then the lock mechanism comes into play and will serve to hold that tool elevated after the clutch has been released. In order to lower the tool from its locked position, it is merely necessary to shove forward again on the control lever 50. This second forward motion of the lever causes the latch 110 to remove the locking roller 122 from the hook 100, so that upon again slightly releasing the pressure on the clutch the tool will descend to its lowermost position under the influence of gravity opposed by the frictional effort imparted by the partially engaged clutch parts. This control is positive and instantaneous in its action in lifting the plow, and it does not depend on the forward motion of the tractor to work the plow out of the ground. It will also be noted that all operations are affected by means of the single manually controlled lever 50.

It will now be apparent that many modifications may be made in this construction within the scope of the present invention, and that the hoisting mechanism may be placed on any of the standard makes of tractors or other power driven vehicle carrying the farm tool to be operated. Also, a plurality of tools may be hoisted by a single mechanism as above described, or each may be lifted by separately actuated and controlled mechanisms. Thus, two plows on a tractor may be separately lifted by operation of separate control devices or both may be lifted by simultaneous movement of the two control levers or a single lever connected for the purpose.

We claim:

1. A hoisting device for a tractor tool comprising a power driven shaft, a rotary member connected to lift the tool, a friction clutch for connecting the shaft with said rotary member for lifting the tool while the clutch is connected, a locking device for holding the tool for an indefinite time in an elevated position, a control lever for connecting and disconnecting the clutch, a latch mechanism connected to the clutch operating lever which is movable on the forward motion of the lever to disconnect the lock and cause the plow to descend and which is movable on the return motion of the clutch lever to engage the lock mechanism and be in position for unlocking the same upon a further forward motion of the clutch control lever, whereby a single control lever serves to elevate the tool to any position and to lower the same at a controlled rate.

2. A hoisting device for a tractor tool comprising a power driven shaft, a rotary member connected to lift the tool, a manually controlled friction clutch operable to connect said member and shaft and lift the tool to a variable height or lower the same at a controlled rate determined by slipping the clutch, a locking device independent of the tool lifting mechanism which operates automatically when the tool is raised to a given elevated position to hold the tool indefinitely in that position, and means including a single manually operable lever to connect the clutch and release said device and thus permit the clutch to control the rate of downward movement of the tool.

3. A hoisting device for a tractor tool comprising a power driven shaft, a rotary member connected to lift the tool, a friction clutch operable to connect said member to the shaft for lifting the tool to a variable height or lowering the same and at a retarded rate, a single manually operable control lever to connect and disconnect the clutch, a lock independent of the tool lifting mechanism which automatically engages and holds the tool indefinitely when it reaches a given elevated position and a lock releasing device connected to the control lever and operable by a succeeding clutch connecting movement of the lever which moves the lock to a released position and leaves the movement of the tool under the control of the clutch.

4. A hoisting device for a tractor tool comprising a frame, a power driven shaft, a rotary member connected to lift the tool, a friction clutch for connecting the shaft with said member and lifting the tool, a manually operable control lever for connecting the clutch, a locking hook on the tool, a cooperating locking support on the frame which automatically engages the hook and holds the tool indefinitely in an elevated position, a latch connected with said control lever and engageable with the locking support to move it from engagement with the hook, and a cam device associated with the latch which operates to move the latch into and out of position for engaging the locking support, said parts being so arranged that one movement of the control lever to connect the clutch causes the tool to be lifted to an elevated position where it is locked and held indefinitely, and a succeeding clutch connecting movement of the lever series to release the locking members and allow the tool to descend under clutch control.

HAROLD A. SCOTT.
ERIC W. CARLSON.